Patented May 15, 1934

1,959,228

UNITED STATES PATENT OFFICE 1,959,228

MANUFACTURE OF PHOSPHORIC ACID REACTION COMPOUNDS FROM TERPENE ALCOHOLS AND HYDROAROMATIC ALCOHOLS

John William Blagden, Loughton, and Walter Edward Huggett, East Ham, London, England No Drawing. Application September 30, 1932, Serial No. 635,704. In Great Britain October 15, 1931

17 Claims. (Cl. 260—153)

It is an object of this invention to provide a process for making addition compounds of terpene alcohols or hydroaromatic alcohols.

In our U. S. Letters Patent, No. 1,932,130, dated October 24, 1933, there is described a manufacture of new compounds from menthols by the action of ortho-phosphoric acid, for example, by mixing the menthol and orthophosphoric acid at ordinary temperature in presence or absence of a solvent. The products appear to be addition compounds of the menthol and phosphoric acid.

According to this invention, similar compounds are made by the action of ortho-phosphoric acid on other terpene alcohols and hydroaromatic alcohols, for instance cyclohexanol and its homologues, such as methylcyclohexanol; fenchyl alcohol; borneol; terpineol.

The new products are in most cases crystalline compounds. For example, cyclohexanol forms a compound with ortho-phosphoric acid which is a crystalline substance melting at 35° C. Crystalline compounds are also obtained from fenchyl alcohol, borneol and terpineol.

The compounds thus produced are stable at ordinary temperatures; they have, in general, sharp melting points but on further heating are decomposed into their constituents. In some cases, if the decomposition temperature is high, dehydration of the alcohol by the action of the liberated acid may occur.

In most cases the products contain three molecules of the alcohol for each molecule of the phosphoric acid, but in certain cases, such as in the case of the borneol compound, the combining proportion is one molecule of alcohol for each molecule of the acid.

The following examples illustrate the invention:—

1. 50 grams of cyclohexanol are mixed at ordinary temperature with 18 grams of ortho-phosphoric acid of specific gravity 1.75, 150 cc. of benzene are added and the mixture is boiled. The benzene which distills is separated from a small quantity of water and returned to the still. The quantity of water which distills with the benzene corresponds with that (namely, 10 per cent.) contained in the phosphoric acid used, no more water being formed. The benzene is then distilled, preferably under slightly reduced pressure, and the residue is allowed to cool, whereby crystals are formed having a melting point of 35° C. The product is very soluble in benzene and in alcohol, and insoluble in petroleum ether. It decomposes on heating at about 100° C. into cyclohexanol and phosphoric acid, without dehydration of the cyclohexanol.

2. 25 grams of fenchyl alcohol, having a melting point of 28°, are dissolved in 50 cc. of petroleum ether, and 10 cc. of ortho-phosphoric acid of specific gravity 1.75 are added to the cold solution. The whole is gently warmed and well shaken, after which it is allowed to separate into two layers and the lower layer, consisting of 7 cc. of unchanged phosphoric acid, is separated. The solvent is then distilled from the upper layer. The residue solidifies to a mass of crystals melting at 54° C. By two re-crystallizations from very small quantities of petrol, the melting point is raised to 63° C. The product is very soluble in benzene and in alcohol, rather less soluble in petroleum ether, and insoluble in water. It is fairly stable towards cold water, but is decomposed by hot water into fenchyl alcohol and phosphoric acid. It is also decomposed into fenchyl alcohol and phosphoric acid by heating in the absence of water to 100°–120° C.

3. 50 grams of commercial borneol of melting point 194° C. are dissolved in 200 cc. of petrol at ordinary temperature and 30 grams of ortho-phosphoric acid of 100 per cent. strength are added. On standing, a new compound separates in the form of crystals, melting at 130° C. with decomposition; it may be washed with a small quantity of petrol. The product is fairly soluble in organic solvents, and is decomposed on heating above its melting point.

4. 20 grams of terpineol, of melting point 34° C. are dissolved in 80 cc. of petroleum ether and the solution is cooled to −10° C. 4.3 grams of ortho-phosphoric acid of 100 per cent. strength are added, whilst stirring. There is formed a clear homogeneous solution from which the solvent is evaporated under reduced pressure, whilst the temperature is maintained at about 5° C. On cooling or seeding, the residue sets to a waxy solid which at this stage has a melting point of 35° C.

After crystallization from twice its volume of petroleum ether, the product is obtained as a stable, fine white crystalline body having a melting point of 45° C.

The product is very soluble in benzene and in alcohol, but more sparingly soluble in petroleum ether. It is slowly decomposed by water into terpineol and phosphoric acid. It decomposes above its melting point, first into terpineol and phosphoric acid, whilst on further heating, the terpineol is rapidly dehydrated.

By using in this example, instead of terpineol of melting point 34° C., 20 grams of commercial liquid terpineol, there is obtained a product which, after crystallization, has a melting point of 39° C.

It is to be understood that the term menthols used in the following claims has the same meaning as in the specification to application for U. S. Letters Patent Serial No. 594,960 dated 24th February 1932, that is to say, it means the compounds belonging to the group consisting of inactive menthol (the racemate corresponding with the naturally occurring laevo-menthol) and its stereoisomers, such as inactive isomenthol and inactive neomenthol, as well as the various optically active forms of these bodies.

Having thus fully described the nature of the said invention and the best means we know of carrying the same into practical effect, we claim:—

1. A manufacture of phosphoric acid compounds by causing an alcohol selected from the class consisting of the terpene alcohols and the hydroaromatic alcohols other than menthols to react with ortho-phosphoric acid.

2. A manufacture of phosphoric acid compounds which comprises reacting about three molecular proportions of an alcohol selected from the class consisting of the terpene alcohols and the hydroaromatic alcohols other than menthols, and one molecular proportion of ortho-phosphoric acid.

3. A manufacture of phosphoric acid compounds by causing an alcohol selected from the class consisting of the terpene alcohols and the hydroaromatic alcohols other than menthols, to react with ortho-phosphoric acid in presence of an organic solvent indifferent to phosphoric acid and separating the product from the solvent.

4. A manufacture of phosphoric acid compounds which comprises reacting about three molecular proportions of an alcohol selected from the class consisting of the terpene alcohols and the hydroaromatic alcohols other than menthols, and one molecular proportion of ortho-phosphoric acid in presence of an organic solvent indifferent to the reactants and separating the product from the solvent.

5. A manufacture of phosphoric acid compounds by causing an alcohol selected from the class consisting of the terpene alcohols and the hydroaromatic alcohols other than menthols to react with ortho-phosphoric acid in presence of a liquid hydrocarbon and separating the product from the solvent.

6. A manufacture of phosphoric acid compounds which comprises reacting about three molecular proportions of an alcohol selected from the class consisting of the terpene alcohols and the hydroaromatic alcohols other than menthols, and one molecular proportion of ortho-phosphoric acid in presence of a liquid hydrocarbon and separating the product from the solvent.

7. A manufacture of phosphoric acid compounds by reacting an alcohol, selected from the class consisting of the terpene alcohols and the hydroaromatic alcohols other than menthols, in the liquid state and ortho-phosphoric acid.

8. A manufacture of phosphoric acid compounds by reacting about three molecular proportions of an alcohol selected from the class consisting of the terpene alcohols and the hydroaromatic alcohols other than menthols, in the liquid state, and one molecular proportion of ortho-phosphoric acid.

9. A manufacture of phosphoric acid compounds which comprises reacting an alcohol selected from the class consisting of the terpene alcohols and the hydroaromatic alcohols other than menthols, and aqueous ortho-phosphoric acid and substantially removing the water from the reaction mixture.

10. A manufacture of phosphoric acid compounds which comprises reacting an alcohol selected from the class consisting of the terpene alcohols and the hydroaromatic alcohols other than menthols, and aqueous phosphoric acid in presence of an organic solvent indifferent to the reactants, substantially removing the water from the reaction mixture by distillation and isolating the product.

11. A manufacture of phosphoric acid compounds which comprises reacting in alcohol selected from the class consisting of the terpene alcohols and the hydroaromatic alcohols other than menthols, and ortho-phosphoric acid in presence of petroleum ether, allowing the whole to stand and separating the crystals which have formed.

12. A manufacture of phosphoric acid compounds which comprises reacting about three molecular proportions of an alcohol selected from the class consisting of the terpene alcohols and the hydroaromatic alcohols other than menthols, and one molecular proportion of ortho-phosphoric acid in presence of petroleum ether, and removing the petroleum ether by distillation.

13. Compounds of terpene alcohols of the empirical formula $C_{10}H_{18}O$ and ortho-phosphoric acid decomposable by heating into an alcohol and ortho-phosphoric acid.

14. Compounds of terpene alcohols of the empirical formula $C_{10}H_{18}O$ and ortho-phosphoric acid containing three molecules of the alcohol for each molecule of ortho-phosphoric acid and decomposable by heating into an alcohol and ortho-phosphoric acid.

15. A crystalline compound of fenchyl alcohol and ortho-phosphoric acid which melts at 63° C.

16. A crystalline compound of borneol and ortho-phosphoric acid which melts at 130° C. with decomposition.

17. A crystalline compound of terpineol and ortho-phosphoric acid which melts at 45° C.

JOHN WILLIAM BLAGDEN.
WALTER EDWARD HUGGETT.